(12) United States Patent
Dominguez Casado et al.

(10) Patent No.: US 6,415,496 B1
(45) Date of Patent: Jul. 9, 2002

(54) PROCESS FOR MAKING A DISMOUNTABLE AND/OR FIXED TRACTION-COMPRESSION COUPLING TO BE APPLIED TO COMPOSITE MATERIALS

(75) Inventors: Rafael Dominguez Casado; Antonio Perez Perez; Manuel Huertas Garcia; Manuel de Castro Nodal; Carlos Cerezo Pancorbo; Bonifacio Robledo Sacristan; César Grueso Diez; Enrique Redondo Vara, all of Madrid (ES)

(73) Assignee: Construcciones Aeronauticas, S.A., Madrid (ES)

( * ) Notice: Subject to any disclaimer, the term of this patent is extended or adjusted under 35 U.S.C. 154(b) by 0 days.

(21) Appl. No.: 09/354,804

(22) Filed: Jul. 16, 1999

(30) Foreign Application Priority Data

Dec. 18, 1998 (ES) ................................................ 9802635

(51) Int. Cl.$^7$ ......................... B23P 11/00; B23P 21/00; B21D 35/00; B64C 1/06
(52) U.S. Cl. ................................ 29/525.01; 29/525.02; 29/469.5; 29/469; 29/DIG. 3; 244/131
(58) Field of Search ......................... 29/525.01, 525.02, 29/469.5, 469, DIG. 3; 244/131, 119, 123

(56) References Cited

U.S. PATENT DOCUMENTS

| 4,228,976 A | 10/1980 | Eiselbrecher et al. ....... 244/123 |
| 4,966,802 A | * 10/1990 | Hertzberg ................... 428/119 |
| 5,496,002 A | 3/1996 | Schütze ....................... 244/123 |
| 5,499,782 A | * 3/1996 | Domine ....................... 244/1 A |

FOREIGN PATENT DOCUMENTS

EP 0732262 9/1996

* cited by examiner

Primary Examiner—S. Thomas Hughes
Assistant Examiner—John C. Hong
(74) Attorney, Agent, or Firm—Ladas & Parry

(57) ABSTRACT

A process for making a dismountable and/or fixed traction-compression coupling to be applied to composite materials, in which a basic laminate (1) of composite material is folded at least once to obtain at least one skirt (2) forming an angle close to 90° with the rest of the laminate; by using a transition radius between the skirt and the rest of the laminate, a set of distribution plates (5, 6) is applied over the basic laminate to stabilize the skirt and produce a uniform load distribution, making holes in each set of distribution skirt-plates and introducing traction bolts (4) with an initial pretension in said holes, hence obtaining the connection between the components to be joined. The invention is applicable to the aerodynamic structures of aircraft.

9 Claims, 4 Drawing Sheets

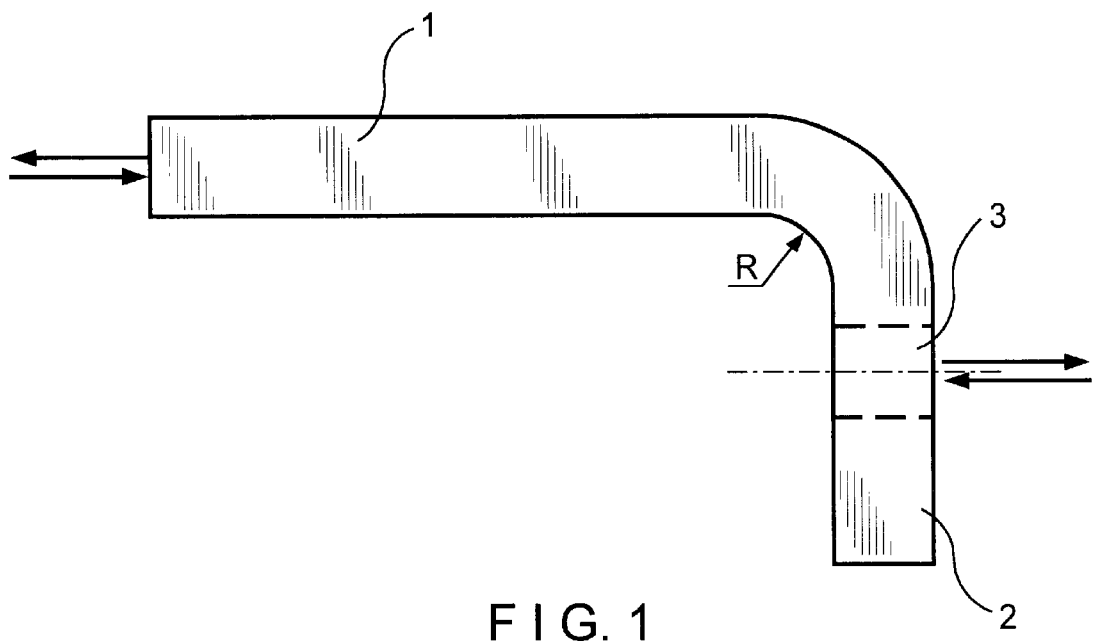
F I G. 1
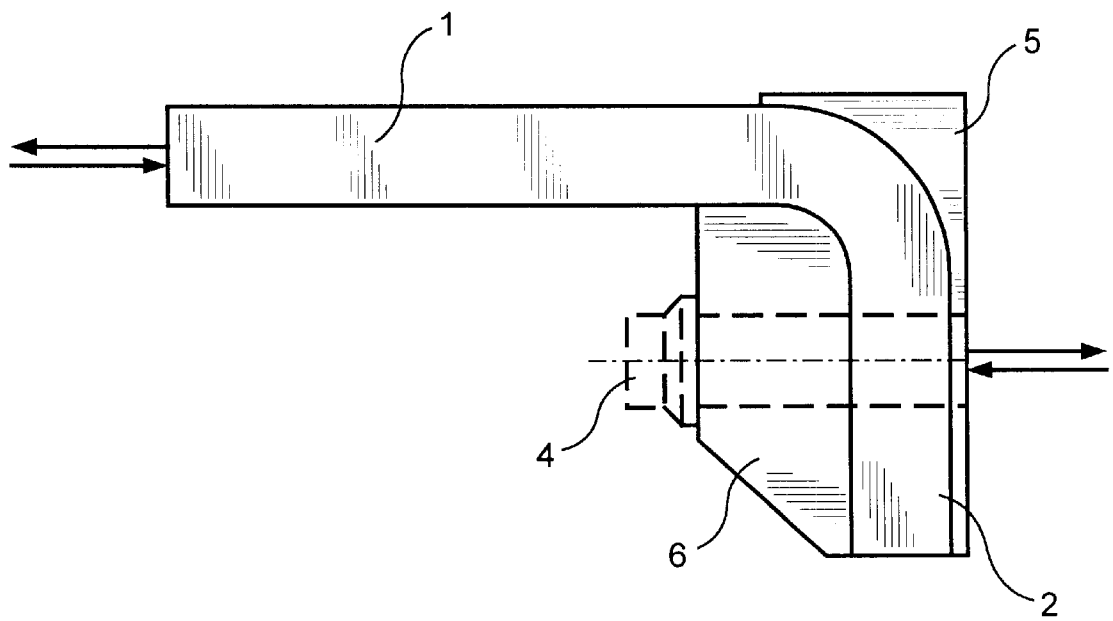
F I G. 2

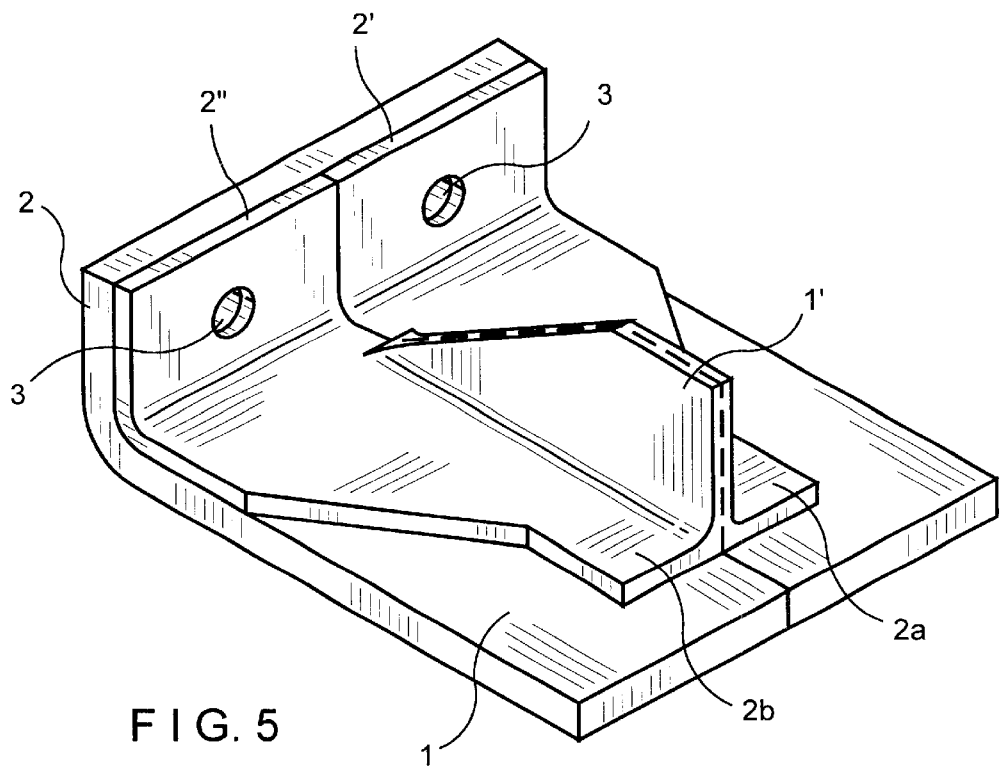
F I G. 5
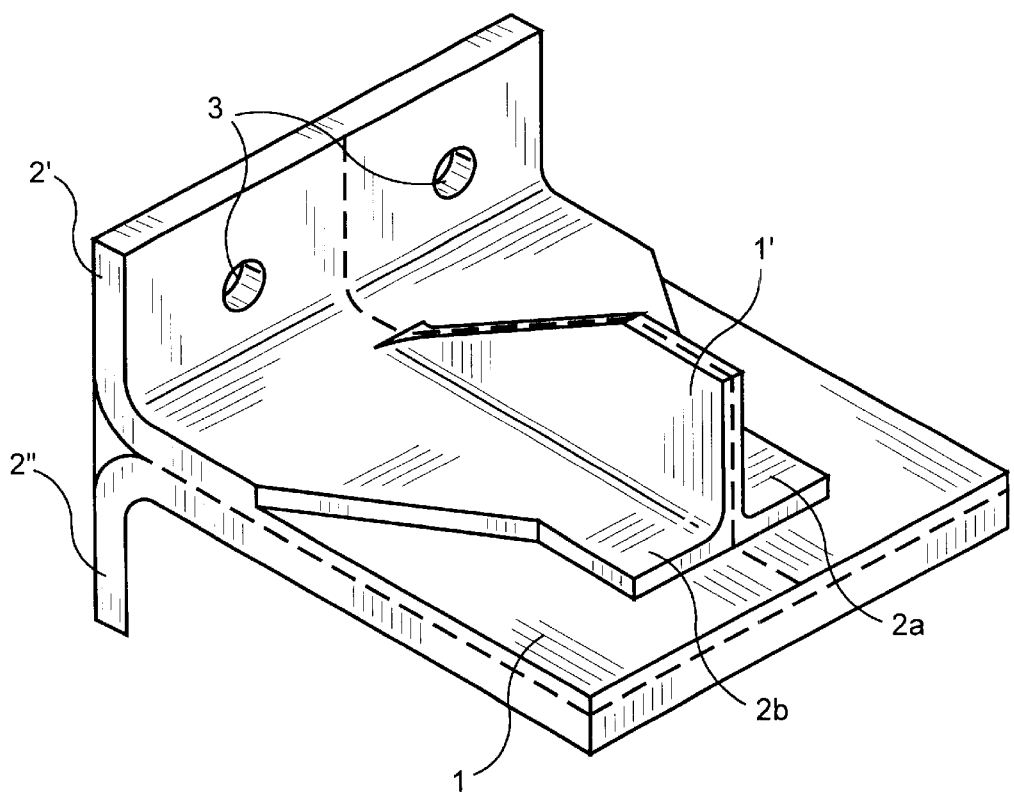
F I G. 6

PROCESS FOR MAKING A DISMOUNTABLE AND/OR FIXED TRACTION-COMPRESSION COUPLING TO BE APPLIED TO COMPOSITE MATERIALS

FIELD OF THE INVENTION

The object of the present invention is to develop the necessary theoretical concepts and their corresponding manufacturing processes to obtain a traction-compression type of coupling between two structural components of which at least one is manufactured with composite materials. The coupling is achieved by means of the application of a certain number of bolts under traction, initially mounting said bolts with a pretension by means of applying a tightening torque and having the double object of (1) transmitting the existing loads between the two structural components mentioned, and (2) being possible to assemble and dismantle these two components.

BACKGROUND OF THE INVENTION

Couplings with bolts of the traction-compression type applied on metals have a broad application, both in the machine field as well as within a wide range of vehicles, clearly indicating their usefulness.

In high performance composite materials, in which their degree of application and development is currently reduced due to their recent appearance in the art, these type of couplings has never been treated directly and in depth. Nevertheless, examples of couplings involving composite materials can be found in patent numbers U.S. Pat. Nos. 5,496,002, 4,228,976 and EP-A-0 732 262.

In recent years, the applicant has been working and developing structures in composite materials, whose coupling has been made under shear. However, it has been considered necessary to have the possibility of applying the dismountable traction-compression type of coupling and to fill this gap, the applicant has implemented a technological plan called L.S.S (Large Supporting Surfaces), in which one of its objectives is to develop the type of coupling, referred to in the present invention.

FIELD OF APPLICATION OF THE INVENTION

The present invention is applicable to one or both components of any type of structure which, having been manufactured with composite materials, has to be joined under load conditions of considerable traction, whilst, in turn, it is recommendable that they may be assembled and dismantled.

These components may be one of the parts of the complex structures belonging to:

Aircraft structures and controls (such as lining joints or fittings).
Spacecraft couplings.
Sea and land vehicles.
Industrial machinery and equipment.
The manufacturing processes involving them include:
Tape or tissue pre-impregnated laminates.
RTM (Resin-Transfer-Molding).
S/RFI (Stitched/Resin Film Infusion).
Filament winding.
Fiber siting.
The materials used may be integrated by different resins and types of fiber, such as:
Glass fiber.
Carbon fiber.
Kevlar.
Boron fiber.

SUMMARY OF THE INVENTION

The object of the invention is a process for making a dismountable and/or fixed traction-compression coupling to be applied to composite materials, in which a basic laminate of the composite material is folded at least once to obtain at least a skirt forming an angle of about 90° to the rest of the laminate, by using a transition radius between the skirt and the rest of the laminate, and a set of distribution plates is applied over the basic laminate to stabilize the skirt and to produce a uniform load distribution, making holes in each set of distribution skirt-plates and introducing the traction bolts in said holes with an initial pretension, hence creating the connection between the two components to be joined.

The single or multiple skirts obtained as indicated above may be applied to flat or curved surfaces, as linings for the aerodynamic surfaces of aircraft and fittings.

The load distribution plates may be of metal or composite material.

According to the present invention, when a single basic laminate is being dealt with, situated on a simple surface, the folded skirt is bent towards one or other side of the reference surface or said skirt is partially bent towards both sides, such that the basic laminate branches off in two parts forming a kind of T.

Conversely, in the case of multiple basic laminates situated in different planes, the skirt of each laminate is bent towards one or other side of the reference surface or said skirt is partially bent towards both sides of said surface forming a kind of T and afterwards the skirts so formed are gradually superimposed to obtain a skirt grouping all the laminates to be joined in an interactive manner.

Likewise, according to the invention, if all or part of the laminates have a secondary nature, they are cut in a suitable transition process until forming a single skirt capable of concentrating within itself the load of all the other skirts and then, the single laminate obtained has its skirt folded towards one or other side of the reference surface or towards both sides of the latter forming a kind of T.

The invention is particularly applicable to the case in which the components to be joined consist of an aerodynamic surface lining-stringer assembly for aircraft structures, where the basic laminate skirt may be singly or multiply folded.

On the other hand, the specific loads of the aforementioned stringers may be integrated in the joint by folding its skirts or by cutting them and providing them continuity with local transition and reinforcement laminates.

BRIEF DESCRIPTION OF THE DRAWINGS

The invention will be understood better by referring to the attached drawings where the essential characteristics of the process of the invention are illustrated, as well as the joint obtained by applying said process.

The drawings show:

FIG. 1: a basic laminate approximately curved in a right angle,

FIG. 2: the curved laminate of FIG. 1 provided with complementary load distribution devices, FIG. 5: several laminates to be joined with multiple cut or folded skirts, FIG. 6: a laminate with multiple skirts folded in T.

DETAILED DESCRIPTION OF THE INVENTION

Figure 3:
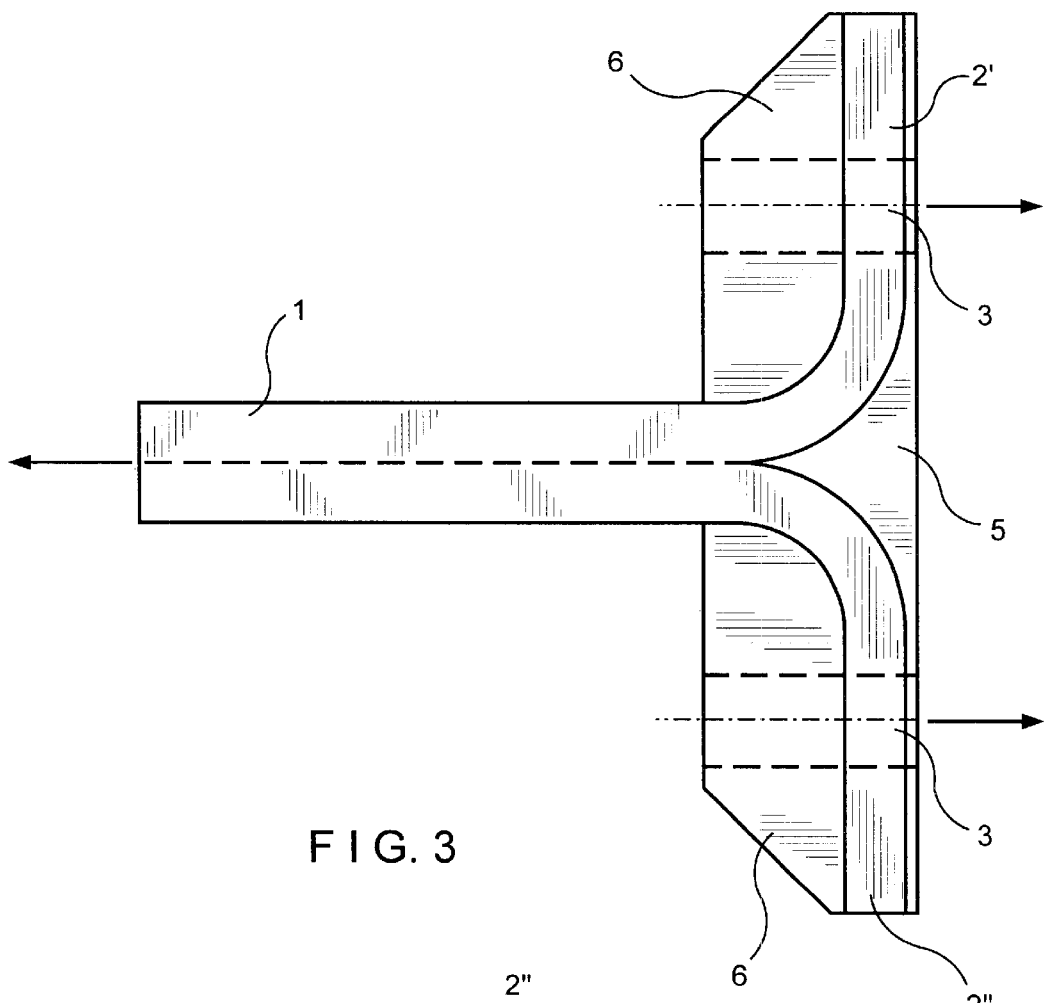
FIG. 3: a basic laminate with a skirt folded towards both sides in a T-shape and with complementary load distribution devices.

The new coupling system developed by the invention directed to composite materials is related to an interactive set of complementary theoretical concepts permitting the final object to be reached. The basic theoretical concepts in two specific areas are described below.

A) Basic Laminate, Object of the Joint

The basic laminate 1 of composite material which is the object of this joint, should be bent when reaching the joint zone or section, such that it remains beyond its plane or own surface with an angle close to 90° by means of a certain folding radius R, to create a skirt 2, folded from the laminate material, as may be seen in FIG. 1.

Said skirt 2, suitably folded, compacted and then cured, will form the basic core over which the traction-compression joint will be centered and later on provided with a series of holes 3, in which the corresponding bolts 4 will be introduced (see FIG. 2).

For skirt 2 to be effective, it should be suitably configured using the specific criteria mentioned in the following point and also forming part of the present invention.

B) Complementary Devices

The traction bolts 4, over which the own load of the joint is concentrated have a specific nature distinguishing them for their high level of concentration, in an opposite position to the load of laminate 1 of composite materials, which is uniform and distributed. Therefore, an intermediate component will be necessary which, like a bridge, satisfies the mission of making the bolts 4 compatible with laminate 1.

For this purpose, some devices called distribution plates 5, 6 (See FIGS. 2 and 3) are applied on each side of the skirt 2.

These distribution plates 5, 6 have a double basic purpose:

To distribute the concentrated load of the bolts 4 as uniformly as possible over all the skirt 2, and To make a perfect adjustment and stabilization of skirt 2, especially in its critical area of the folding radius R.

The joint plates 5, 6 may be made of metal or the same composite material of the basic laminate 1.

The adjustment tolerance between the distribution plates 5, 6 and the folded skirt 2, as well as the nature and characteristics of the coupling bolts 4 has been taken into account in the development of the present invention.

The forces acting over the basic laminate 1 are represented by the arrows appearing in FIGS. 1 to 3.

Using the aforementioned basic theoretical concepts, different types of joints have been developed, which are shown below and are grouped in two generic areas according to their nature:

Type A—With a single basic laminate situated on a simple surface.

In this case, the folded skirt 2 may be bent to one or other side of the reference surface of the basic laminate 1, or partially to both sides, the basic laminate 1 being branched off in two partial skirts 2', 2" forming a kind of T, as may be seen in FIG. 3.

Type B—With multiple basic laminates situated in different planes.

In this type, two different technologies have been developed:

Type B.1

Figure 4:
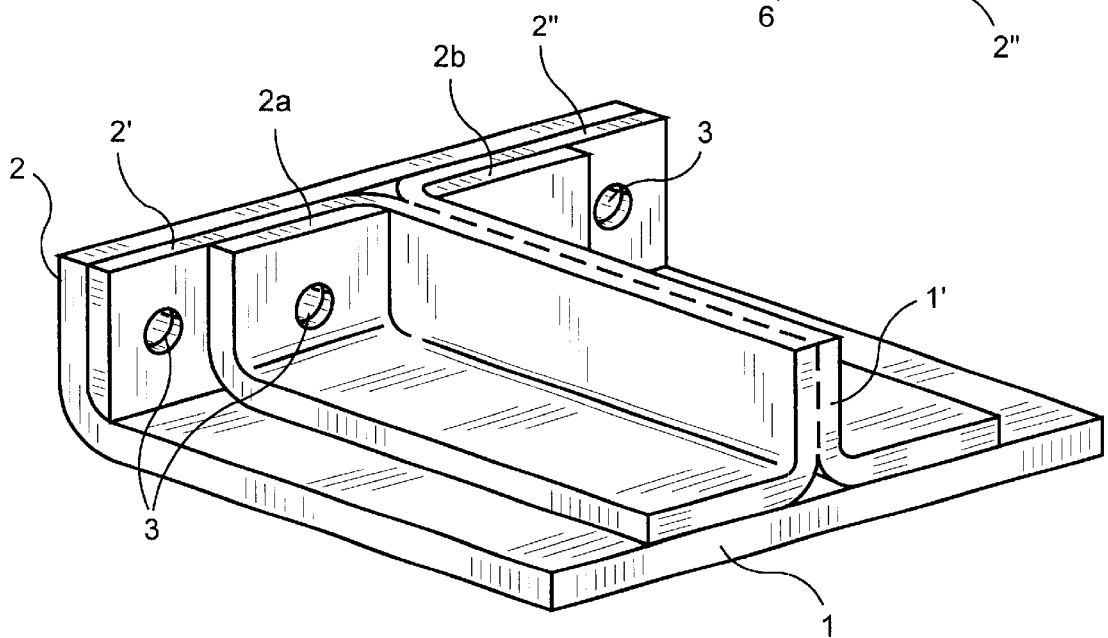
FIG. 4: several laminates to be joined with multiple folded skirts.

Each one of the laminates 1, 1' is individually treated as was specified for type A and, then, their corresponding folded skirts 2, 2', 2", 2a, 2b are progressively superimposed in a more or less complex manner, hence obtaining a skirt grouping, in an interactive manner, all the laminates 1, 1' which are the object of the joint, as may be seen in FIG. 4.

Type B.2

In this type, all or part of the laminates 1, 1' that may have a secondary nature, are cut in a suitable transition process until obtaining a single skirt capable of concentrating in itself the load of the rest. Once this situation has been reached, the single laminate obtained may have its skirt folded, by applying either of the Type A possibilities, as illustrated in FIGS. 5 and 6.

Under the point of view of the theoretical definition, the previously studied basic concepts may be summarized by applying the following three phases:

Phase 1:

Fixing the basic conditioners configuring the object of the joint:

Loads that should be transmitted.

Geometric configuration.

Technical characteristics that should be met.

Phase 2:

The object of this second phase is to determine some dimensionless parameters whose values define a geometric configuration of the joint, being necessary in this process to guarantee a reasonable level of compatibility and uniformity between values.

In the development of the present invention, the applicant has worked intensely with a large number of tests which have allowed six dimensionless parameters to be defined, and by using them, to determine both the degree of influence of each one individually and the overall effect of all of them, always taking into account their compatibility and homogeneity.

Figure 7A:
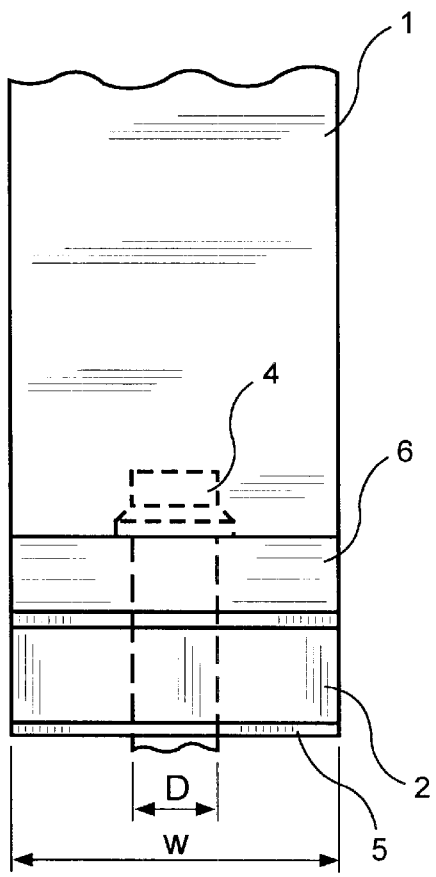
FIGS. 7A, 7B and 7C: seen in front elevation, in side elevation and in plan showing the basic geometrical data of a laminate prepared according to the invention.
Figure 7B:
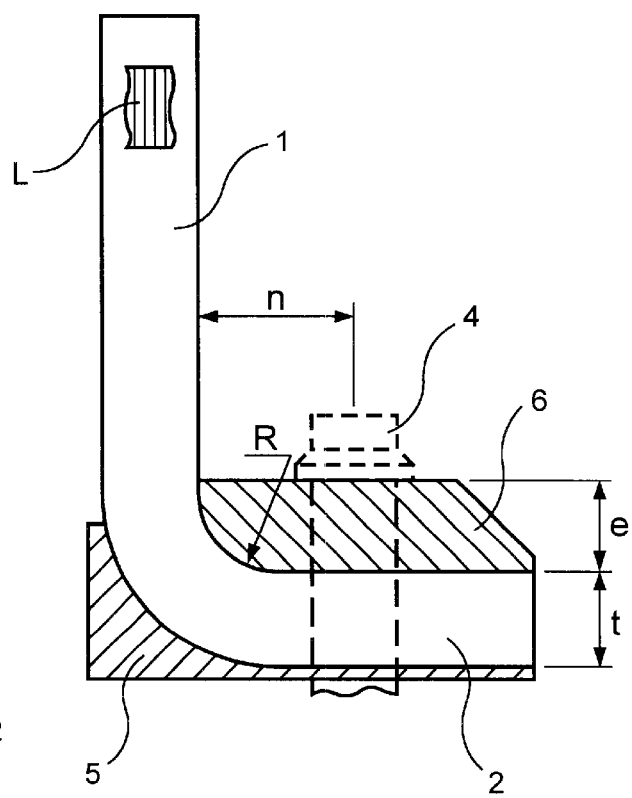
Figure 7C:
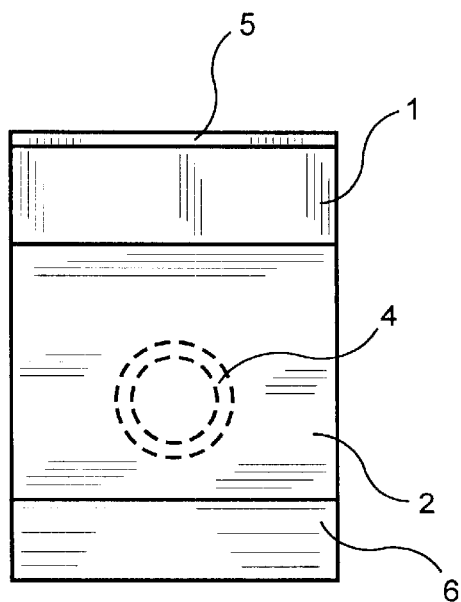

Referring to FIGS. 7A, 7B and 7C, the definition of these six dimensionless parameters is given below:

(n/t) Relative distance from the bolt 4 to the basic laminate 1 (degree of eccentricity).

(e/t) Relative thickness of the distribution plate 6 (degree of uniformity and rigidity).

(R/t) Relative internal folding radius (maximum degree of possible micro-deformation).

P=(W/D) Relative distance between bolts 4 (degree of uniformity).

L (% 90°) Percentage of laminate 1 to zero degrees (degree of laminate effectiveness).

(D/t) Relative diameter of the bolts 4 (degree of effectiveness of the own bolt effect).

With these six parameters, some analytical expressions or individual charts have been determined which define their corresponding influence factor. The product of the six factors defines the overall factor, determining the specific capacity of the joint obtained.

Phase 3

This phase comprises the calculation, the verification of resistance and the optimization of the configuration of phase 2 to determine the reliability of the joint obtained.

In all the above, the essential characteristics of the invention have been described, although, as may be understood, it would be possible to make modifications of certain details of the coupling process developed by the applicant. For this reason, it is intended that the scope of the invention is only limited by the contents of the following claims.

What is claimed is:

1. A process for forming a coupling to connect components to transmit traction and compression forces, said process comprising:

providing a first laminate made of fiber reinforced resin material, folding said first laminate to form a base and an upstanding skirt attached to the base through a bend angle, applying distribution means on said first laminate to stabilize said skirt and provide uniform distribution of forces in the laminate, forming holes through said distribution means and said skirt, and inserting traction bolts in said holes to attach a component to said laminate, wherein a second laminate is provided so that two laminates form the coupling, the base of the second laminate extending perpendicularly to the base of the first laminate, the base of the second laminate being divided and folded to form wings extending away from one another into juxtaposition with the base of the first laminate, said wings being folded to form further skirts which are juxtaposed with said skirts of the first and second laminates, said holes comprising first holes extending through said juxtaposed skirts of said first and second laminates and second holes extending through the juxtaposed skirts of said first and second laminates and said further skirts of said second laminate.

2. The process of claim 1, in which said skirt of the first laminate is bent from said base of the first laminate at an angle of about 90°.

3. The process of claim 1, wherein said further skirts extends away from one another to form a T-shape for said second laminate.

4. The process of claim 1, comprising forming the distribution means as a metal plate.

5. The process of claim 1, comprising forming the distribution means as a plate of a composite material.

6. The process of claim 1, wherein said first and second laminates are integrally formed with one another.

7. The process of claim 1, wherein said first laminate is bent to form said skirt on said base and said first laminate is curved after ths skirt has been bent.

8. The process of claim 1, wherein said traction bolts are applied under pre-tension.

9. The process of claim 1, wherein said distribution means is in the form of plates which embrace said skirt and said base.

* * * * *